United States Patent [19]
Pouilloux

[11] 3,815,652
[45] June 11, 1974

[54] TIRE WITH FLEXIBLE CORD CARCASS CONSTRUCTION AND METHOD OF MAKING SAME

[75] Inventor: Jacques Pouilloux, Saint Gratien, France

[73] Assignee: Pneumatiques Caoutchouc Manufacture et Plastiques Kleber-Colombes, Colombes, France

[22] Filed: Apr. 5, 1972

[21] Appl. No.: 241,290

[30] Foreign Application Priority Data
Apr. 5, 1971 France .............................. 71.12015

[52] U.S. Cl. ......... 152/356, 152/362 R, 156/110 C, 156/422
[51] Int. Cl. .... B60c 9/08, B60c 15/04, B29h 17/28
[58] Field of Search ............ 152/356, 362 R, 361 R; 156/110 A, 110 R, 110 C, 117, 135, 136, 397, 422

[56] References Cited
UNITED STATES PATENTS

| | | | |
|---|---|---|---|
| 1,170,597 | 2/1916 | Archer | 152/362 R |
| 1,559,142 | 10/1925 | Ames | 152/362 R |
| 3,024,828 | 3/1962 | Smith et al. | 152/356 |
| 3,675,702 | 7/1972 | Schroeder | 152/356 |

Primary Examiner—M. Henson Wood, Jr.
Assistant Examiner—Robert Saifer
Attorney, Agent, or Firm—Craig & Antonelli

[57] ABSTRACT

A tire and method of making the same, according to which the tire possesses a radial carcass formed at least within the sidewalls by meridian arcs from pliable cord; the arcs which are spaced circumferentially are constituted from one and the same continuous flexible cord or from a small number of such cords while circumferenial portions extend longitudinally and alternatively on one and on the other side in the beads whereby the circumferential portions are juxtaposed in the form of longitudinal bundles made from strand material which constitutes the bead reinforcements.

32 Claims, 12 Drawing Figures

PATENTED JUN 11 1974 3,815,652
SHEET 1 OF 4

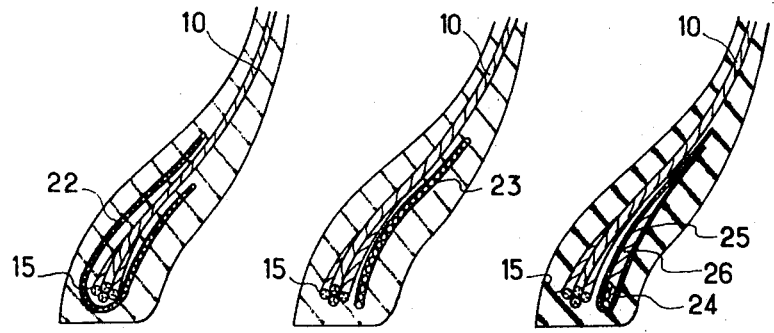
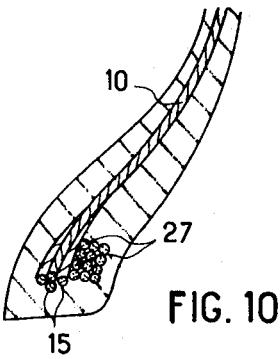
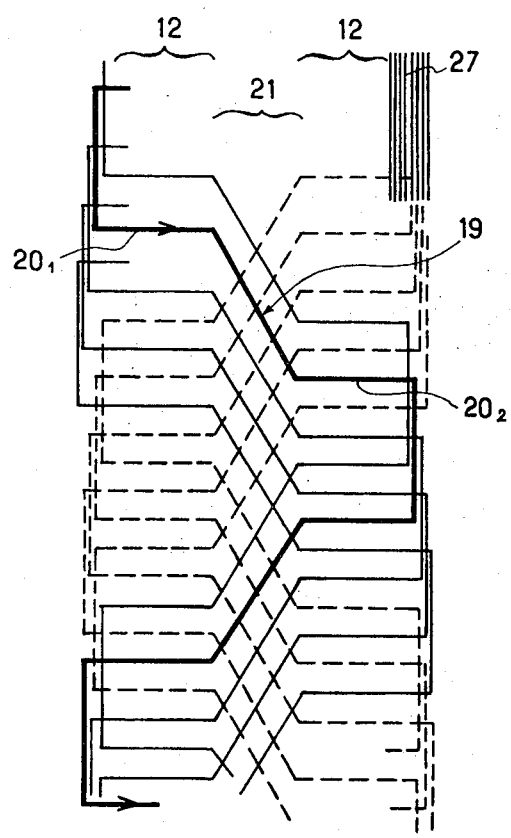

TIRE WITH FLEXIBLE CORD CARCASS CONSTRUCTION AND METHOD OF MAKING SAME

The present invention relates to tires of the type in which the carcass is constituted, at least within the area of the sidewalls, of arcs of pliable cords oriented along radial or meridian planes of the tire.

The carcasses of tires are generally constituted in the prior art of one or several layers of plies of pliable cords coated with rubber, cut to the desired length and shape in a calendered sheet of cord fabric of great length. These plies are wound individually on the drum of a building machine to form a tubular rough shape or outline, of which the edges are thereupon turned over about circular steel bead cores constituting the resistant reinforcements of the beads of the tire. After the shaping of this rough outline, to impart thereto an approximately semi-toroidal shape, one places on its top an inextensible belt and a tread, and thereafter the assembly is vulcanized in an appropriate mold.

This manner of construction of tires requires, prior to the fabrication properly speaking, an important and significant stock of equipments for the preparation of semi-finished products necessary for the manufacture: installations for the preparation of sheets of cord fabric and adhesion treatment thereof, calendering installations, cutters, manufacturing installations of bread cores, etc. as well as encumbering equipments for storing these semi-finished products between different stages of the manufacture.

It has already been proposed to manufacture tires of the type with a crossed (or bias) carcass by forming the carcass by winding a single cord in successive undulated spirals along a geodetic path to form a double reinforcement layer in the form of a lattice, in which the strands cross at a bias from one layer to the next, the spirals being sufficiently lengthened to extend in part tangentially to the beads of the tire. Due to this structure, the latter are deprived of the usual bead wires and they have a tendency, during the inflation of the tire, to contract themselves and to enclose the wheel rim. Even though this process by winding of a wire or cord permits, in principle to dispense with important preparation equipments of the semi-finished products necessary with the classical process, it does not appear to have encountered any success. It is true that this process by winding permits to obtain only tires with a crossed carcass which, as is known, offers a totality of road qualities considered inferior to that of the radial tires.

It has also been proposed to manufacture resistant tire structures, and more particularly top belts, by winding a strand in zig-zag form, in sinusoidal form, in triangular form, etc. ... in such a manner as to obtain continuous bands in the circumferential direction and formed of several superposed layers in which the juxtaposed portions of the cord are at a bias and cross one another from one layer to the other. However, it only involves partial solutions which do not permit to obtain the principal objectives of the present invention; namely, a suppression as complete as possible of the manufacture of semi-finished products to be assembled during the manufacture, thanks to the application of the general winding process of a flexible or pliable cord, and the realization of tires of the type with radial carcass which possess the totality of the qualities of the tires of this type as well as other advantages facilitating their fabrication and their utilization.

The present invention is concerned to that end with a tire of the type with a radial carcass formed at least within the sidewalls of meridian arcs of pliable cord, characterized in that the circumferentially spaced arcs of the carcass are constituted from one and the same continuous pliable cord forming at the same time the said spaced arcs and circumferential portions extending longitudinally and alternatively in one and the other of the beads, the said circumferential portions being juxtaposed in the form of longitudinal bundles made from strands which constitute the reinforcement of the beads.

By spaced arcs, one understands arcs in the carcass which are spaced from one another in the circumferential direction in such a manner that the juxtaposed circumferential portions of the cords of adjacent arcs adhere longitudinally one against the others along a sufficient circumferential length and that the bundles are constituted themselves of a number of sufficient cords to form a bead reinforcement susceptible to resist to the extension to maintain the tire on its rim in the conditions of use of the tire.

Preferably, the entire carcass is constituted essentially of a single continuous strand, or at the most, of a small number of continuous cords, each cord forming successively a meridian arc, a circumferential portion extending longitudinally in one bead, a second meridian arc followed by a second circumferential portion extending longitudinally in the other bead and so on over the entire circumference of the carcass. After this continuous cord has thus described a complete turn, it extends preferably to form a second series of meridian arcs which are interposed between the first arcs, and a second series of circumferential portions juxtaposed alongside the first ones. After a certain number of turns, which depends from the size of the tire and the thickness of the cord, this same continuous cord forms the complete carcass with meridian arcs arranged side-by-side in the same semi-toroidal plane and with bundles of circumferential strand portions, along the edges, constituting the reinforcement of the beads. As a modification, the cord may be interrupted from place to place, for example, after a complete turn or after several turns and may be follwed by another continuous cord of the same nature or of a different nature insofar as the material is concerned from which it is made and insofar as its dimensions or its constitution are concerned. In the latter case, one will take the necessary measures in order that the interruptions of the cords are localized within the zones of the beads of the tire.

The connection between the arcs and circumferential portions may take place by elbow portions at right angle of the strand, or by rounded-off or oblique elbow portions. In the latter case, the bent rounded-off or oblique connecting portions of adjacent arcs cross one another within an area of transition between the beads and the sidewall portions of the carcass to form a more resistant structure with respect to the transmission of starting and braking torques. In the one or the other case, the region of the beads and this transition zone may be reinforced additionally by other reinforcement elements of classical, known type such as strips, flippers and/or auxiliary bead wires, rubber elements or gums having a high modulus of elasticity of any known type, etc.

These and other objects, features and advantages of the present invention will become more apparent from the following description when taken in connection with the accompanying drawing which shows, for purposes of illustration only, several embodiments in accordance with the present invention, and wherein.

Figure 4:
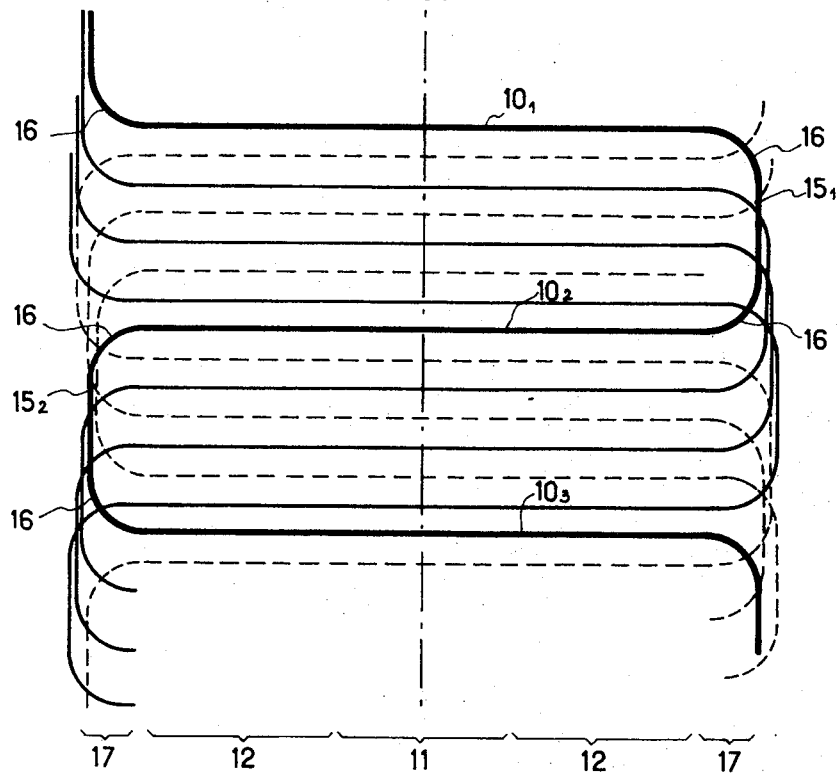
Figure 5:
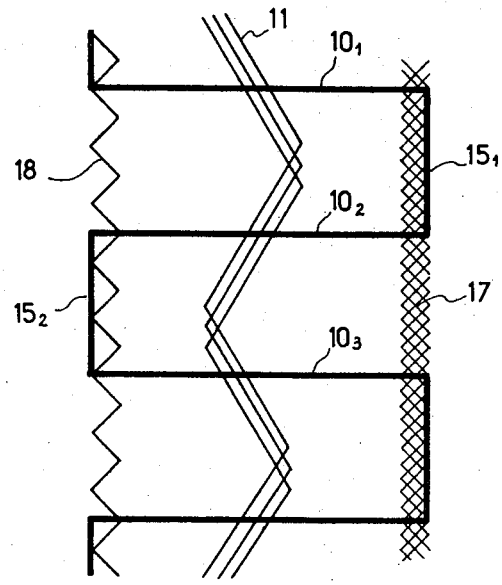
Figure 11:
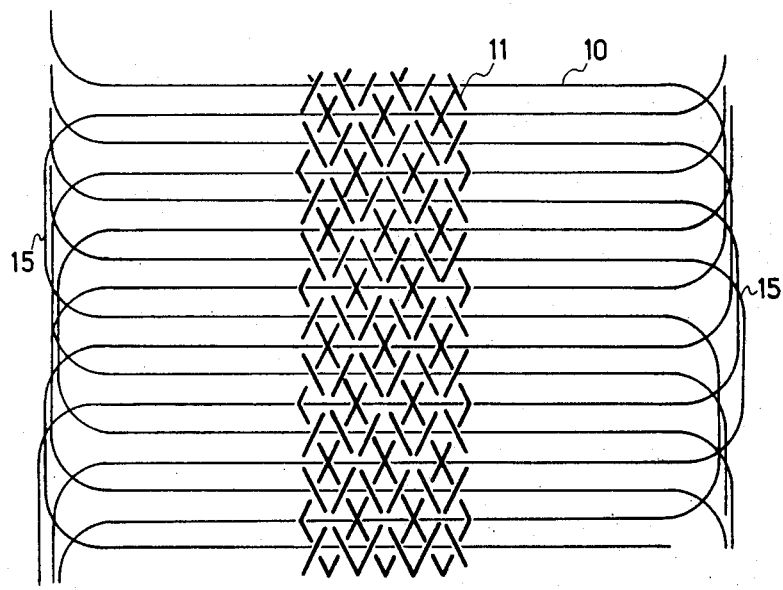
Figure 12:
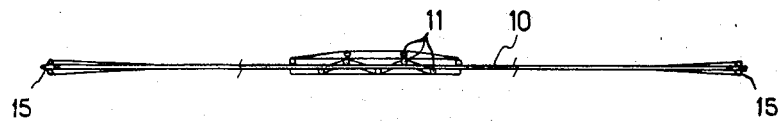

FIGS. 4, 5, and 6 are schematic views illustrating modified embodiments of the path of the continuous cord in accordance with the present invention;

FIGS. 7, 8, 9 and 10 are partial cross-sectional views, illustrating modified embodiments of tire beads in accordance with the present invention; and FIGS. 11 and 12 illustrate schematically another modified embodiment of the present invention with an overlapping belt.

Figure 1:
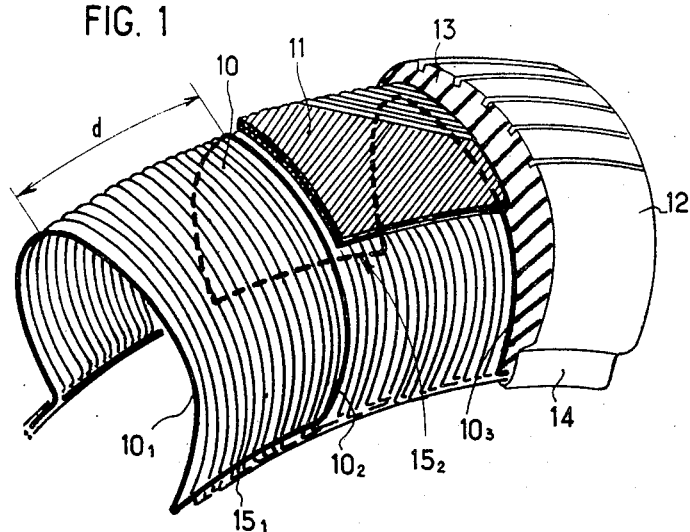
FIG. 1 is a perspective view illustrating a portion of a tire in accordance with the present invention.

Referring now to the drawing wherein like reference numerals are used throughout the various views to designate like parts, and more particularly to FIG. 1, in this embodiment, the tire comprises a carcass 10 formed of contiguous meridian arcs contained in the same approximately semi-toroidal surface. The top of this carcass 10 is banded by a belt 11 which is substantially inextensible in the circumferential direction, and the assembly is covered by the side wall bands 12 and by the tread 13. The lateral edges of the carcass 10 are embedded in beads 14 serving to seat the tire on the rim of the wheel.

Figure 2:
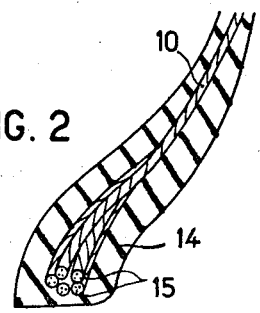
FIG. 2 is a cross-sectional view, on an enlarged scale, illustrating the details of the construction of the bead of the tire of FIG. 1.

According to the present invention, the meridian arcs $10_1$–$10_2$–$10_3$– . . . of the carcass 10, which are spaced circumferentially from one another by a distance $d$ are constituted by one and the same continuous cord which forms, in addition to these arcs, circumferential portions $15_1$–$15_2$– . . . extending longitudinally and alternatively in one and the other of the beads 14. After having described a complete turn of the tire, the same cord forms a second series of meridian arcs intermeshing between the first arcs $10_1$–$10_2$–$10_3$– . . . and a second series of circumferential portions which are juxtaposed to the first circumferential portions $15_1$–$15_2$– . . . along a certain part of their length. After several turns, the same continuous cord forms meridian arcs which are sufficiently close to one another to constitute a complete carcass 10 and, within the beads 14, bundles of longitudinal portions made of cord material constituting together the circumferential reinforcement of the beads 14. FIG. 2 illustrates the structure of these beads 14: whereas within the body of the carcass 10, the meridian arcs are situated side-by-side in one and the same surface as the cords of a ply of "cord" fabric, the lateral portions of these arcs spread out somewhat in the beads 14 to permit to the longitudinal portions 15 to juxtapose themselves in a bundle which fulfills the role of the usual reinforcing bead wire or bead core of the bead. This bundle is embedded in the rubber of the bead 14 which is advantageously a rubber having a high modulus of elasticity in order to reinforce the cohesion of the assembly.

Figure 3:
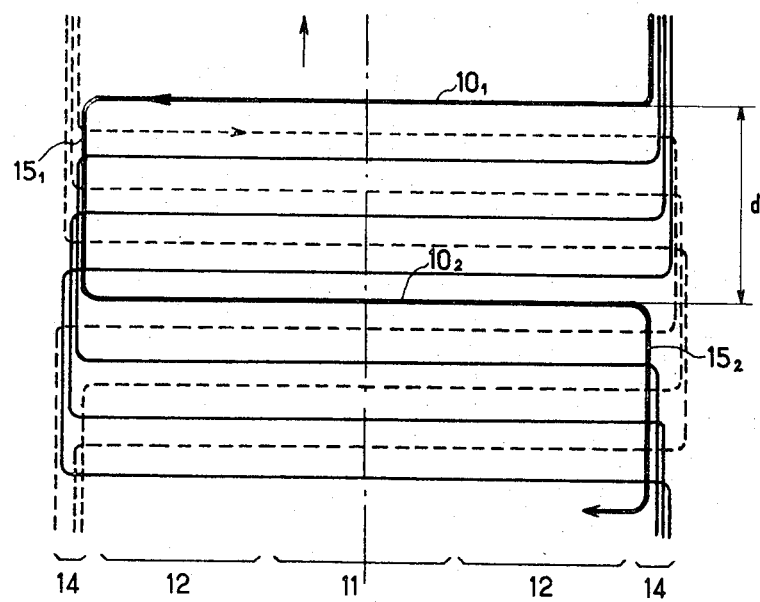
FIG. 3 is a schematic view illustrating the path of the continuous cord of the carcass of the tire in accordance with the present invention.

FIG. 3 illustrates schematically the path of the continuous cord in a developed portion of tubular carcass such as it exists prior to the shaping operation of the tire. For a better understanding and clarity of the drawing, the same cable has been represented by different lines without, however, indicating thereby that one has resorted to several cords of different nature as has been suggested hereinabove as an alternative. It can be seen from FIG. 3 that the cord describes successively a transverse portion corresponding, for example, to the meridian arc $10_1$ within the finished tire, then a longitudinal portion $15_1$ followed by another transverse portion $10_2$ spaced from the first meridian arc $10_1$ at a distance $d$ and itself followed by another longitudinal portion $15_2$ disposed on the opposite edge. The transverse and longitudinal portions are connected by elbow portions at right angle and the various longitudinal portions 15 are juxtaposed along the two edges of the tubular sheet formed finally by the same cord.

In the example which has just been described, the top belt 11 of the tire is also constituted, in a manner known as such, from one and the same continuous cord or cable which is wound zig-zag from one edge to the other to form two superposed layers in which the portions of the cord cross from one layer to the other along a slight angle with respect to the equitorial plane in order to render the belt substantially inextensible in the circumferential direction. The entire resistant structure of the tire; that is, the carcass, the belt, and the reinforcement of the beads may thus be constituted from a single cord or a small number of continuous cords, which makes possible the suppression and elimination of a large part of the equipments and of the manufacturing operations of the semi-finished products serving normally to realize these portions of the tire. It is, however, obvious that the belt 11 may be realized otherwise in accordance with numerous constructions which have already been proposed or utilized effectively in practice.

The tire thus constituted represents the general structure, and thus the running properties, of tires with a radial carcass of this type, even though its series production can be realized in a more economic manner. In contrast thereto, due to the absence of the usual bead wires, the beads 14 of the finished tire exhibit a much greater flexibility which facilitates their assembly on the wheel rim. On the other hand, there are, within the beads, no turned-up edges with cut cord ends, which eliminates one of the principal causes of failures due to detachment between the rubber and these ends of the cords.

FIG. 4 illustrates in a manner analogous to FIG. 3 a portion of the developed carcass constituted again by one and the same continuous cord, but within which the longitudinal portions $15_1$–$15_2$– . . . are connected to the transverse portions $10_1$–$10_2$–$10_3$– . . . by elbow portions 16 rounded-off in the form of arcs of a circle or following any other progressive curve assuring a good continuity between these two successive portions. In the finished carcass, these rounded-off portions cross one another obliquely within a transition zone 17 located between the beads 14 and the sidewalls 12 of the carcass. By suitably choosing the curvature of these elbows 16, one can vary the height of this transition zone 17 to impart to this portion the best resistance to the forces which it carries, in particular the torques to be transmitted between the wheel and the circumference of the tire. The elbow portions 16 may, in particular, be realized in such a manner as to form on each side of the tire a transition zone 17 extending up to approximately half the height of the sidewalls of the tire. The successive elbow portions may also be of unequal heights in such a manner that the upper edges of the transition zones 17 have a scalloped appearance. Finally, the rounded-off elbow portions 16 may be replaced by oblique connecting portions.

FIG. 5 illustrates again, in the developed condition, a carcass portion constituted essentially by a continuous cord forming successively the transverse portions $10_1$–$10_2$–$10_3$– . . . and the longitudinal portions $15_1$–$15_2$– . . . as illustrated in the embodiments of FIGS. 3 and 4. The edges of this carcass are additionally reinforced in this embodiment by a wire or cord 18 wound zig-zag within the areas of the beads 14 and the transition areas 17 between the beads 14 and the sidewalls 12. The belt 11 is also constituted of a single continuous wire or cord wound zig-zag within the central area of the carcass.

FIG. 6 illustrates schematically another modification of the present invention in which the continuous cable describes, within the central area of the carcass, an oblique path 19 between two meridian arc portions $20_1$–$20_2$ located within the areas corresponding to the sidewalls 12 of the carcass. These oblique portions 19 of adjacent arcs cross one another along a slight angle to form within the finished tire, a zone 21 substantially inextensible in the circumferential direction and being used as top or apex belt. According to the manner of winding the cord, the oblique portions 19 may be superposed in two layers or may overlap one another in a braided or woven structure.

The oblique portions 19 may be connected to the meridian portions $20_1$–$20_2$ by obtuse angles, as illustrated in the drawing, or by progressive curves in such a manner that the oblique portion 19 have the shape generally of extended sinusoids forming on each side of the belt zones of continuous transition for the transmission of forces. On the other hand, when in certain tire dimensions, the apex or top of the oblique carcass 21 formed by mutually crossing portions 19 runs the risk of being insufficient to replace completely the usual belt, this apex or top of the carcass may be reinforced by an additional belt applied above the apex area 21.

The tires comprising a carcass of the radial type constituted by a continuous single cord or by a small number of continuous strands according to the described arrangements in the preceding examples of the present invention may be additionally reinforced in certain portions when this is necessary for the intended use. FIGS. 7 to 10 illustrate embodiments of utilization of such additional reinforcements within the beads 14.

In the case of FIG. 7, the edge of the carcass 10, with its bundle of longitudinal portions 15 is reinforced by a strip 22 folded over the edge of the carcass. In the embodiment of FIG. 8, one utilizes a simple strip 23 which is placed substantially flat against the external face of the edge of the carcass up to the lower level of the bundle 15. In the embodiment of FIG. 9, one utilizes an auxiliary wire 24 accommodated in the fold of a flipper 25 enclosing a filling strip of hard rubber 26, the entire auxiliary reinforcement being applied against the external face of the edge of the carcass. This auxiliary wire may be replaced by a simple circumferential winding 27 realized along the edge of the carcass, above the longitudinal bundle $15_1$–$15_2$ as illustrated schematically in FIG. 6. In the finished tire, the winding 27 is located on the outside of the bundle 15 of each beading as illustrated in FIG. 10. This winding 27 may be made with the same cord as that serving for the manufacture of the carcass or with a cord of different nature. Numerous other constructional modifications may be deduced from these four examples as to relative emplacement of the additional reinforcement or reinforcements with respect to the edge of the carcass, of the number of reinforcements, of their dimensions, etc. . . . in such a manner as to resolve the particular problems which may be encountered in practice, whereby the reinforcements in the form of strips may be realized as usual by cutting at a bias in cord fabric in order to have the cords oriented along the desired angle. They may also be realized at the very moment of the manufacture of the tire on its drum, by circumferential winding of a continuous cord as in the example of FIG. 10. These reinforcements may also be constituted by rubber strips having a very high modulus made of rubber suitably reinforced by dispersed fibers or charges.

FIGS. 11 and 12 illustrate schematically another modification of the present invention in which the continuous cord constituting the carcass 10 and the continuous cord constituting the belt 11 are caused to overlap with one another at the moment of the manufacture of the tire to form within the area of the apex of the tire a lattice structure. Such a belt overlapping with the carcass forms one body with the latter in an assembly which practically cannot disassociate itself under the most severe conditions of use. Additionally, the absence of cut cord ends along the edge of this belt eliminates a cause of loosening or detachment between the edges of the belt and the rubber of the tread surface. The same is therefore more effectively retained on the top of the tire.

The continuous cord utilized for the carcass 10 and the other elements of the tire may obviously be one of the usual textile cord, of rayon, nylon, polyester, etc. . . , but one may also preferably utilize textile material with very high modulus of elasticity such as the glass cord, the carbon strands and the metallic cord constituted by very fine elementary filaments and possessing a high flexibility. These cord are generally treated with a view of their adhesion to the rubber and may be preliminarily coated with a cover of crude rubber obtained by causing the end to be passed through an appropriate coating machine.

Several continuous cords of different nature may obviously be utilized successively or simultaneously by several laying devices of known type in one and the same tire to constitute each, one of the various portions of portions tire. Thus, for example, the carcass may be constituted from one or several textile cords of different nature, the belt from another textile cord and the additional reinforcements from another textile or metallic cord. The possibility of thus combining cord of different natures provides still more flexibility for the manufacture than the other known classical processes. Moreover, various possibilities of the arrangement of these cord permit to reinforce, at will, the portions of the tire as a function of forces which it must absorb. However, in addition thereto, the progressive variations in direction which one is able to impose on one and the same cord permit to assure a better continuity in the distribution of the stresses imposed on the tire.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A tire with a radial carcass formed, at leas within its sidewalls, by meridian arcs of a flexible cord means, characterized in that circumferentially spaced arcs of the carcass are constituted from one and the same continuous flexible cord means forming, simultaneously, the spaced arcs and circumferential portions extending longitudinally and alternatively in one and the other of tire beads of the tire, said cord means being repeatedly wound on the tire such that said circumferential portions are juxtaposed in the form of longitudinal bundles of cord means which constitute reinforcement means for the beads.

2. A tire according to claim 1, characterized in that the carcass is constituted essentially by a single continuous cord.

3. A tire according to claim 1, characterized in that the carcass is constituted essentially by a small number of continuous cords.

4. A tire according to claim 1, characterized in that each cord means forms successively a meridian arc and a circumferential portion extending longitudinally within the bead, a second meridian arc spaced from the first arc and followed by a second circumferential portion extending longitudinally within the other bead and so on along the entire circumference of the carcass.

5. A tire according to claim 4, characterized in that the arcs of the carcass are connected to the circumferential portions by elbow portions.

6. A tire according to claim 5, characterized in that the elbow portions are substantially at right angle to one another.

7. A tire according to claim 5, characterized in that the arcs of the carcass are connected to the circumferential portions by rounded-off elbow portions.

8. A tire according to claim 5, characterized in that the arcs of the carcass are connected to the circumferential portions by oblique elbow portions.

9. A tire according to claim 5, characterized in that the elbow portions cross each other obliquely within a transitional area between the beads and sidewalls to form a structure more resistant to torques.

10. A tire according to claim 5, characterized in that resistant reinforcement means of the beads are formed by the longitudinal bundles of the cord means of the carcass and by additional reinforcing elements.

11. A tire according to claim 1, characterized in that resistant reinforcement means of the beads are formed by the longitudinal bundles of the cord means of the carcass and by additional reinforcing elements.

12. A tire according to claim 11, characterized in that said additional reinforcing elements include strips.

13. A tire according to claim 11, characterized in that said additional reinforcing elements include flippers.

14. A tire according to claim 11, characterized in that said additional reinforcing elements include auxiliary bead wires.

15. A tire according to claim 11, characterized in that said auxiliary reinforcing elements include at least one strip of rubber hard.

16. A tire according to claim 11, characterized in that the additional reinforcing elements are constituted by a continuous wire.

17. A tire according to claim 16, characterized in that said additional reinforcing elements are wound circumferentially.

18. A tire according to claim 16, characterized in that said additional reinforcing elements are wound in zig-zag.

19. A tire according to claim 11, characterized in that a top belt means is formed by a continuous cord wound zig-zag in a number of superposed layers with portions on a bias at a slight angle.

20. A tire according to claim 19, in which the continuous cord means constituting the carcass and the continuous cord constituting at least one of the belt means and additional reinforcing elements of the beads overlap one another in a woven structure.

21. A tire according to claim 11, characterized in that the additional reinforcing elements are constituted by a continuous cord.

22. A tire according to claim 21, characterized in that said additional reinforcing elements are wound circumferentially.

23. A tire according to claim 21, characterized in that said additional reinforcing elements are wound in zig-zag.

24. A tire according to claim 1, characterized in that a top belt means is formed by a continuous cord wound zig-zag in a number of superposed layers with portions on a bias at a slight angle.

25. A tire according to claim 24, in which the continuous cord means constituting the carcass and the continuous cord constituting at least one of the belt means and additional reinforcing elements of the beads overlap one another in a woven structure.

26. A method for manufacturing a tire having a radial carcass formed, at least within the sidewall portions thereof, of meridian arcs of flexible cord material, comprising the steps of laying the cord forming the carcass in such a manner that it extends a predetermined distance in the circumferential direction within the area of the tire forming the bead on one side of the tire, thereupon laying the cord in a transverse direction corresponding to a meridian arc, thereafter laying the cord so as to extend again a predetermined distance in the longitudinal direction within the area of a bead on the other side of the tire, thereafter laying a transverse portion forming a meridian arc spaced from the first-mentioned arc, thereafter laying another portion in the circumferential direction on the one side of the tire and so on in such a manner that the circumferential portions laid in the area of the bead of the tire are juxtaposed to one another while the transverse portions constituting the meridian arcs of the tire carcass are disposed adjacent one another.

27. A method according to claim 26, characterized in that a single continuous cord is used to form the carcass of the tire as well as the bundle of reinforcing cord constituted by the juxtaposed circumferentially extending portions and forming the reinforcements for the tire beads.

28. A method according to claim 26, characterized in that a small number of cords are used to form the radial carcass of the tire consisting of the meridian arcs and the longitudinal reinforcing portions.

29. A method according to claim 26, wherein cord is laid in such a manner as to form elbow sections of substantially right angle between the longitudinal and transverse portions.

30. A method according to claim 26, wherein the cord is laid in such a manner as to form rounded-off transitional portions between the longitudinal and transverse portions.

31. A method according to claim 26, characterized in that mutually crossing rounded-off portions are formed between the circumferential and transverse portions of the cord.

32. A method according to claim 26, characterized by simultaneously laying a belt from a continuous cord with the laying of the carcass in such a manner that the meridian arcs and the belt overlap one another in a woven structure.

* * * * *